United States Patent [19]
Davis et al.

[11] 3,832,013
[45] Aug. 27, 1974

[54] ANTI-SKID CONTROL SYSTEM FOR FLUID PRESSURE BRAKES

[75] Inventors: Dennis J. Davis, Oberlin; John E. Juhasz, Avon, both of Ohio

[73] Assignee: The Bendix Corporation, South Bend, Ind.

[22] Filed: Mar. 8, 1973

[21] Appl. No.: 338,806

Related U.S. Application Data

[63] Continuation of Ser. No. 76,665, Sept. 30, 1970, abandoned.

[52] U.S. Cl. .................................. 303/21 P, 303/20
[51] Int. Cl. ............................................. B60t 8/12
[58] Field of Search ................ 188/181; 303/20, 21; 317/5; 324/161–162; 340/52 R, 53, 262–263

[56] References Cited
UNITED STATES PATENTS

| | | | |
|---|---|---|---|
| 3,398,995 | 8/1968 | Martin | 303/21 BE |
| 3,556,610 | 1/1971 | Leiber | 303/21 P |
| 3,604,760 | 9/1971 | Atkins | 303/21 CG |
| 3,620,576 | 11/1971 | Wehde et al. | 303/21 BE |
| 3,640,589 | 2/1972 | Taniguchi | 303/21 BE |

FOREIGN PATENTS OR APPLICATIONS

1,901,476  7/1970  Germany .................. 303/21 BE

*Primary Examiner*—Duane A. Reger
*Assistant Examiner*—Stephen G. Kunin
*Attorney, Agent, or Firm*—Ken C. Decker; William N. Antonis

[57] ABSTRACT

An anti-skid fluid pressure brake control system particularly designed for use under conditions of exceptionally low tire to road co-efficient of friction on the order of wet ice, apparatus being provided to relieve braking pressure upon the simultaneous occurence of low wheel speed just short of lock up and a predetermined deceleration rate and thereafter continuing pressure relief for a prolonged period of time preferably determined by the length of time it takes the wheel to reach a maximum rate of acceleration whereupon relief is terminated and pressure build up restored. Apparatus are provided for shifting to a regular adaptive mode of brake control should the vehicle encounter less severe road conditions during the brake application.

5 Claims, 4 Drawing Figures

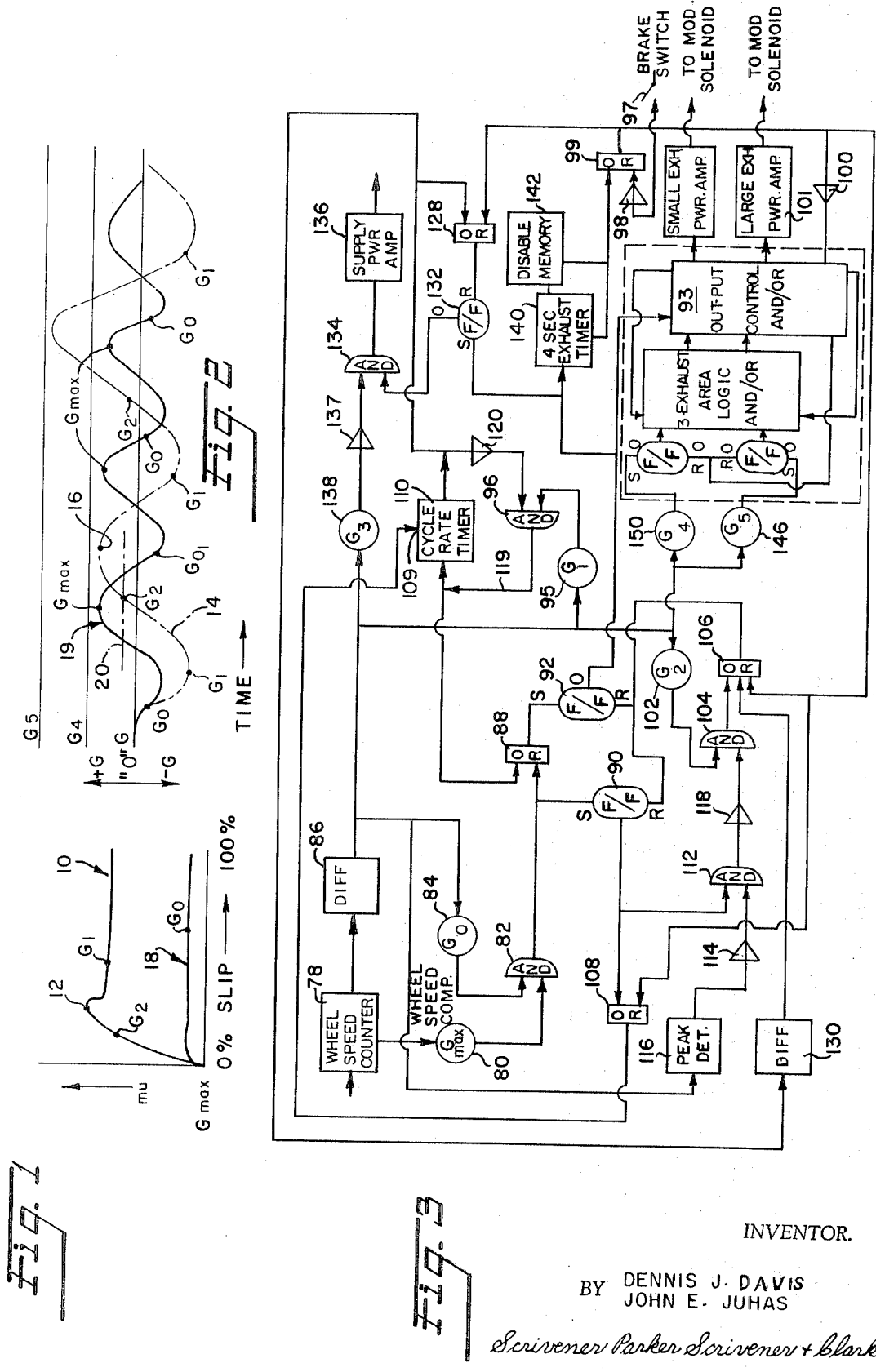

INVENTORS
DENNIS J. DAVIS
JOHN E. JUHASZ
BY
Scrivener Parker Scrivener + Clarke
ATTORNEYS 3,832,013

ANTI-SKID CONTROL SYSTEM FOR FLUID PRESSURE BRAKES

This is a continuation of application Ser. No. 76,665, filed Sept. 30, 1970 now abandoned.

DESCRIPTION OF THE INVENTION

This invention relates to fluid pressure braking systems and more particularly to adaptive anti-lock braking control for fluid pressure braking systems.

Adaptive braking, as this term has become recognized in the art, is a system utilized in conjunction with a regular fluid pressure braking system and is designed to prevent wheel lock under variable conditions such as wheel loading, tire/pavement coefficient of friction ($M\mu$) and vehicle speed by changing the control action so as to adapt to the several variations and optimize braking performance under incipient skid conditions. Generally speaking, adaptive braking systems sense wheel deceleration and at a pre-selected level thereof, G1, approaching a skid condition a signal is generated to open independent exhaust valve means and relieve the braking pressure at a controlled rate to enable the wheel to recover. When the wheel has accelerated to a pre-determined level, G2, a second signal is generated closing the exhaust valve so that brake pressure build-up recommences until the wheel has again slowed to the G1 level whereupon the cycle is repeated. This will hereinafter be referred to as the primary adaptive system.

Prior adaptive systems operate with acceptable reliability to prevent wheel lock-up while retaining optimum braking pressure for a broad spectrum of conditions but under certain unusual conditions, as for example, where a road may be exceptionally slippery or where a vehicle may run from a dry road onto an icy bridge or where otherwise the primary system referred to above is unable to cope, a very low actuator pressure is sufficient to bring the wheels into nearly locked condition and means should be provided to open the exhaust valve just prior to wheel lock-up and without relying on a G1 signal. Further, the exhaust valve means should be retained open longer than would be normally permitted by a G2 signal in order to exhaust as much pressure as is necessary to permit proper wheel recovery in light of the unusual road conditions.

The broad object of the present invention is to provide an over-ride system for a normal G1/G2 adaptive control which senses impending wheel lock-up at a low wheel speed and at a deceleration level less than the normal G1 level and opens the exhaust valve at this point and thereafter inhibits the normal G2 signal to retain the exhaust valve open until sufficient pressure has been relieved to ensure that the wheel has recovered out of its impending skid condition.

More particularly it is an object of the invention to provide a system which accomplishes the foregoing while being adaptable to severe road conditions so that the exhaust valve means are retained open for varying periods as determined by the length of time it requires for a wheel to reach its peak acceleration following the opening of the exhaust valve.

Another object of the invention is to provide a system to handle conditions which the primary system is unable to contend with.

Yet another object of the invention is to provide fail-safe means for disabling an adaptive system in the event of malfunction thereof.

Referring now to the drawings:

FIG. 1 are plots of wheel slip against tire/road coefficient of friction ($M\mu$) for normal and slippery road conditions;

FIG. 2 is a graphical depiction of the mode of operation of the system of the present invention relative to a normal G1/G2 adaptive mode of operations;

FIG. 3 is a schematic diagram of logic and control circuits which may be employed with the present invention.

Figure 4:
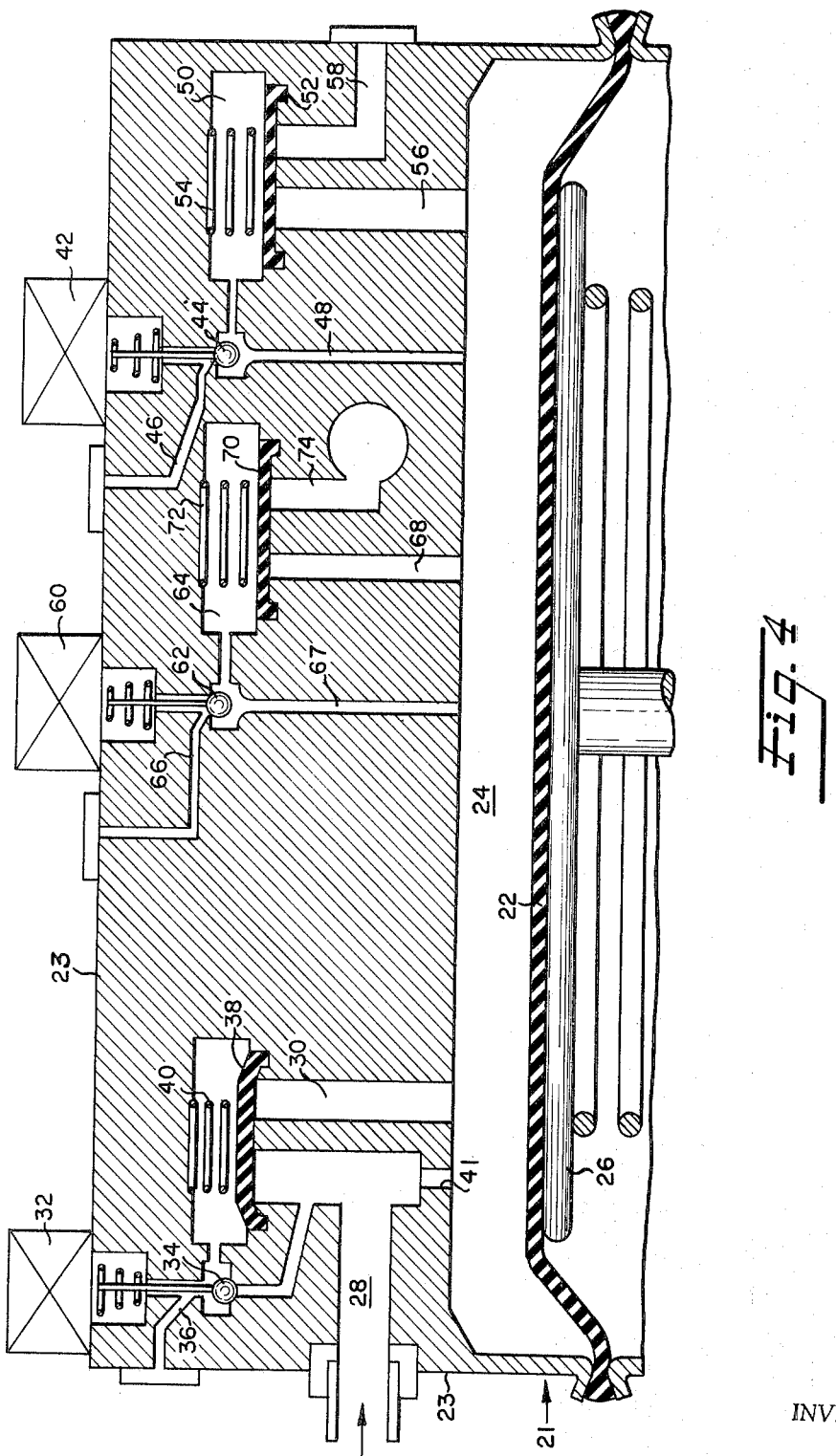
FIG. 4 is a schematic representation of a fluid pressure brake actuator with pressure modulating control means which may be employed with the present invention.

Referring now to the drawings and particularly to FIGS. 1 and 2, the numeral 10 designates a typical $M\mu$-slip curve for average dry road conditions. When there is impending wheel lockup, due to a panic stop, for example, on such a road an adaptive braking system relieves and applies braking pressure at the points G1 and G2, respectively, on the opposite sides of the peak 12 of the curve. Referring specifically to the phantom line curve 14 of FIG. 2 with a wheel traveling initially at uniform speed, when the brakes are applied so that a wheel approaches incipient skidding, at a deceleration level G1 the normal adaptive system operates to restrict the supply and open an independent exhaust valve to permit the wheel to recover. When the wheel has accelerated to a level G2 the exhaust valve is closed and pressure build-up recommences at a controlled rate in the brake actuator with the wheel continuing to accelerate to some peak level indicated by the numeral 16 at which point the wheel commences to decelerate until the G1 level is again met, whereupon the cycle is repeated until the vehicle is brought to a stop.

Referring back now to FIG. 1, the numeral 18 designates a $M\mu$-slip curve for an extremely slippery road and under these conditions at a deceleration level less than G1, and hereinafter referred to as $G_o$ (see the solid line curve 19 in FIG. 2), the wheel may quickly slow to a lock-up condition without ever passing through a G1 deceleration level and thus the normal adaptive system is ineffective to prevent skidding. In accordance with the present invention the foregoing problem is solved by sensing not one but two conditions of the wheel, neither of which is dependent on a G1 deceleration and when both conditions are encountered simultaneously, the system of the invention takes control by way of what will be referred to as the adaptable override mode wherein the exhaust valve is opened earlier and retained open longer than would be optimum for a skidding condition on a normal dry road.

The first condition sensed is deceleration of the wheel to the aforementioned $G_o$ level which, as can be seen in FIG. 2, is substantially less than the G1 level. The second condition sensed is wheel speed and when the wheel has slowed to a predetermined minimum velocity just short of lock-up, say 5 miles per hour, and has at the same time decelerated to the $G_o$ level then, in accordance with the invention, conditions are satisfied for the override mode of the invention to take control. Upon this occurrence, the exhaust valve is opened and as can be seen by curve 19 in FIG. 2, after a short period of increasing deceleration, the wheel commences to accelerate and in the course of doing so it reaches a G2 level as indicated by the broken horizontal line 20. However, were the exhaust valve to be closed at this point, excessive pressure might be trapped in the actuator and as soon as pressure build up recommenced upon closing of the exhaust valve, the wheels would almost certainly go into immediate full lock-up with a consequent danger of vehicle skid.

Thus in accordance with a further aspect of the invention, when the system has gone into the override mode in response to the combined $G_o$/wheel speed signal, the normal G2 signal is inhibited or delayed so as to have no effect on the exhaust valve, preferably until the wheel has achieved a point of peak or maximum acceleration, as indicated by the point G max. in FIGS. 1 and 2, though the delay period would be determined by fixed delay means. At the termination of the delay period, a signal is generated to close the exhaust valve and effect pressure restoration with the cycle being repeated so long as the wheel speed drops to the preselected near lock-up level at the same time that it reaches a $G_o$ deceleration level.

Referring now to FIG. 4, there is illustrated a fluid pressure actuator 21 more particularly described in the co-pending application of Davis et al., Ser. No. 75,314, filed Sept. 25, 1970 now U.S. Pat. No. 3,677,609 and assigned to the same assignee as the present application. Though the present invention is not limited to use with the actuator of FIG. 4, the invention will be described in such use. The actuator comprises a diaphragm 22 whose upper side forms with a pressure plate 23 a pressure chamber 24, the opposite side of the diaphragm being engaged by the usual spring loaded push plate 26. Carried on the pressure plate 23 of the actuator are modulating valve means having three variable exhaust areas, any one of which may be selectively opened in accordance with the particular signal generated in response to residual wheel acceleration following the closing of the exhaust valve at point G2. As described in the co-pending application if the wheel continues to accelerate to a level G4 but not to a higher level G5 (see FIG. 2) the same exhaust area is repeated as was opened during the last cycle. If the wheel accelerates beyond the higher level G5, then the next smaller exhaust area is opened at the next G2 signal and if the wheel does not reach the G4 acceleration level a signal is generated opening the next larger exhaust area.

Briefly, when the pressure is admitted to the actuator from the brake control valve via the delivery passage and port 28, 30 so as to apply the brakes with sufficient force that a skid is imminent, that is to say, the wheel slows to the G1 level, a supply valve solenoid 32 is energized to move a control valve 34 from the position of the drawing to an upper position closing off an exhaust passage 36 and admitting delivery pressure to the upper side of a diaphragm valve 38 which operates in conjunction with a spring 40 to move the valve downwardly and close off the inlet port 30 whereupon delivery pressure enters the brake chamber solely through a bleed port or choke 41. The G1 signal also initially energizes a solenoid 42 which moves a valve member 44 from an upper position closing off an exhaust passage 46 to a lower position closing off an inlet passage 48 whereupon pressure in a cavity 50, operating to close an exhaust valve 52, is vented to atmosphere via the passage 46 thus permitting the valve 52 to be raised against a spring 54 by the brake pressure chamber in a large exhaust passage 56 to permit the relief of chamber pressure to atmosphere by way of an exhaust passage 58. As the pressure escapes through the passages 56,58 it is simultaneously fed into the pressure chamber through the bleed port 41, but because the cross-sectional area of the exhaust passage 56 is larger than the bleed port 41, the pressure in the chamber 24 descends at a controlled rate until the wheels have accelerated to the G2 level whereupon the solenoid 42 is de-energized so that the control valve 44 returns to the position of FIG. 4 and the exhaust valve 54 is consequently moved to its closed position to recommence the build up of pressure in chamber 24. As explained in the co-pending application so long as the system is operating in the adaptive mode and the wheel acceleration does not exceed a predetermined high level, the supply valve solenoid 32 remains energized and the supply valve 38 is retained closed. Following closing of the exhaust valve should the wheel not have accelerated to the G4 level as indicated at the point 16 in FIG. 2 a signal is transmitted through the logic circuit shown and described in the aforementioned co-pending application to instruct the system that the commencement of the next cycle, the next larger exhaust area is to open. Thus when the wheel again decelerates to the G1 level, under the conditions stated the solenoid 42 is energized as well as the second solenoid 60 controlling a valve 62 which is lowered from the position of FIG. 4 to connect a vent passage 66 with a cavity 64 while disconnecting the latter from a passage 67 leading into the pressure chamber 24 to enable a second diaphragm exhaust valve 70 to be moved to its open position by the pressure in a small area exhaust passage 68. Thus when the two solenoids are energized, pressure in chamber 24 is vented to atmosphere through both the large area exhaust passage 56 and the small area passage 68, these two together constituting the next larger exhaust area than was opened during the last cycle.

When the adaptable override system of the present invention functions with the above described valve road conditions would be such that a wheel would not likely accelerate to the G4 level and hence at the commencement of the next cycle following an initial cycle, the next higher exhaust area would be opened which would be both exhaust passages 56,68, that is to say, the maximum exhaust area and this would be repeated while in the adaptable override mode and the logic and circuitry required to control the varying exhaust areas in dependence upon the G4 and G5 acceleration level have no pertinency to the description of the present invention and this aspect will be alluded to hereinafter only incidentally.

With reference now to FIG. 3, when a wheel encounters road conditions whereby upon a brake application the wheel both decelerates to the level $G_o$ and at the same time slows to near lock-up speed, this information is sensed by a wheel speed counter 78 and transmitted to a wheel speed comparator 80 which produces a positive output signal when the signal it receives from the counter indicates a near lock-up wheel speed of, say, 5 mph. This wheel speed signal is fed to one input of an AND Gate 82 whose other input is derived from a $G_o$ comparator 84 responsive to a $G_o$ signal received from a differentiator 86 connected to the output of the counter 78 and constructed and arranged to produce an output voltage proportional to wheel acceleration.

Thus with a $G_o$ signal and a 5 mile per hour signal at the inputs of the respective comparators, their output signals render both the inputs of the AND Gate 82 positive and the latter conducts a signal to the set input of a flip-flop 90 and to one input of an OR Gate 88 having an output connected to the set input of a second flip-flop 92. With both flip-flops set their outputs become positive, with the output signal of flip-flop 92 being fed to the input of an output control box 93 which operates in response to the signal as if it had received a signal representative of a wheel deceleration to the aforementioned G1 level.

In the event that the wheel had not encountered the severe conditions producing the simultaneous $G_o$/wheel speed signals just described, but the braking force was nevertheless too great for existing conditions so that skidding is imminent, a G1 comparator 95 is provided to initiate a regular adaptive mode of brake control when the wheel slows to the normal G1 level. As can be seen the input of the G1 comparator 95 is connected to the output of the differentiator 86 and when the output of the latter exceeds the reference level of the G1 comparator, a signal is produced at the output of the latter which is fed to the set input of the aforementioned flip-flop 92 by way of one input of an AND Gate 96 (whose second input is normally positive as will be explained) and a second input of the OR Gate 88. Thus the flip-flop 92 may be set either by a combined $G_o$/5 mile per hour signal, that is to say by an effective G1 signal, or by an actual G1 signal, the response of the output control box being identical for either situation.

It should be noted at this point that the output control box is conditioned for operation by a brake switch signal derived from closing of a brake switch 97 to produce a positive signal which is inverted by an inverter 98 to a zero signal at one input of an OR Gate 99 whose output is connected to a variety of components to be described among which is an input through an inverter 100 to the output control box 93 whereby the latter is conditioned for operation whenever the brake switch is closed by depression of the brake pedal.

Upon receipt of an effective or actual G1 signal in the output control box, a signal is transmitted to a large exhaust amplifier 101 to energize the solenoid 42 and connect the brake chamber 24 to atmosphere via the intermediate exhaust area defined by the passage 56 as previously described. The wheel now commences to accelerate and eventually reaches the G2 level in FIG. 2 and at this point if the brakes were being controlled in the regular adaptive mode the exhaust valve would be closed in response to a signal produced by the G2 comparator 102 whose input is connected to the differentiator 86 and whose output would, in the absence of the adaptable override system of the present invention be connected directly to the reset input of flip-flop 92 so that the output signal of the latter would be extinguished to deenergize solenoid 42 in FIG. 4 to close the exhaust valve and effect restoration of slow pressure build up in the actuator through the bleed port 41. However, in the adaptable override mode it is desired to retain the exhaust valve open a longer time than would be permitted by the normal G2 signal and to effect this the normal G2 signal is inhibited or delayed for a period of time beyond the G2 level of wheel acceleration and though this delay period may be fixed and such a delay is within the purview of the invention, desirably the delay will be variable and determined by the length of time it takes the wheel to achieve a maximum rate of acceleration following the opening of the exhaust valve and because the time of maximum acceleration will vary as road conditions vary during a given braking session, by relating the time delay to maximum wheel acceleration, rather than to a fixed period, the system in the override mode is adaptable to the variable conditions mentioned before.

Referring now to the G2 comparator 102 it will be seen that its output is connected to one input of an AND Gate 104 whose output is connected to one input of a multi-input OR Gate 106 whose output leads to the reset inputs of the flip-flops 92, 90. Thus when the G2 reference level of wheel acceleration is reached the G2 comparator puts out a signal but if the second input of AND Gate 104 is zero, as it normally is in an adaptable override mode as will be explained, this G2 signal has no effect.

Referring now to flip-flop 90 when it is set in response to the simultaneous production of $G_o$/wheel speed signals, the positive output signal of flip-flop 90 is fed to one input of an OR Gate 108 whose output in turn is fed to a desirable input 109 of a cycle rate timer 110 whose function will be later described, it being sufficient to state at this point that when in an adaptable override mode, the override signal disables the cycle rate timer so that it can have no effect during override.

The output of the flip-flop 90 is also fed to one input of an AND Gate 112 whose other input is connected through an inverter 114 to the output of a peak detector 116 whose input is connected to the output of the differentiator 86. The peak detector is constructed and arranged to generate a signal at its output only when the differentiator produces an output signal representative of a wheel's maximum rate of acceleration, that is G max. in FIG. 2. At all other times the output of the peak detector is zero which is converted by inverter 114 to a positive signal and fed to the second input of AND Gate 112 so that when the first input becomes positive by the setting of flip-flop 90, the output of AND Gate 112 becomes positive but this signal is inverted by an inverter 118 to zero and is fed to the second input of AND Gate 104 whose output is thus zero so that the signal fed to OR Gate 106 is also zero and with its other two inputs at zero, as they are at this stage, there is no signal fed to the reset inputs of the flip-flops 92, 90. In short, so long as the output of the peak detector 116 is zero and the flip-flop 90 is set by a combined $G_o$/5 mile per hour wheel speed signal, no signal can be passed from the G2 comparator 102 through AND Gate 104 to the reset input of flip-flop 92 so that the signal at its output remains and the exhaust valve solenoids are retained energized.

However, when the system is not in the adaptable override mode, the flip-flops 90, 92 are automatically reset by the positive signal produced by opening of the brake switch with this signal being fed to the reset inputs of the flip-flops through a second input of the OR Gate 106. With the output of flip-flop 90 now at zero, it will be apparent that one input of AND Gate 112 is zero so that its output must also be zero with this signal being inverted to a positive signal by inverter 118 at the lower input of AND Gate 104. Thus except when in an adaptable override mode, the lower input of AND Gate 104 is always positive and whenever a normal G2 signal is received at the other input, a positive signal is produced at the output of AND Gate 104 and transmitted to the reset input of flip-flop 92 to effect closing of the exhaust valve at a G2 wheel acceleration just as if the adaptable override were not a part of the system.

To summarize the foregoing, when in an adaptable override mode, when a G2 signal appears at the output of the G2 comparator 102 this signal remains so long as wheel acceleration is at the G2 level or above. However, the signal cannot get through to have any effect on the system until the wheel has reached a maximum rate of acceleration whereupon the peak detector 116 produces a positive signal which enables the G2 signal to travel to the set input of the flip-flops 92,90 to close the exhaust valve and also provide a zero signal at the upper input of AND Gate 112 thereby ensuring the presence of a positive signal at the lower input of AND Gate 104 so that the system is in readiness for normal adaptive braking wherein it responds to the usual G1 and G2 signals in the event tire/road conditions improve so that adaptable override control is no longer appropriate.

Referring back now to the cycle rate timer, it will be noted that its regular input 119 is connected to the output of the G1 comparator 95 through the lower input of AND Gate 96. The upper input of AND Gate 96 is connected to the output of the timer 110 through an inverter 120 which converts the normal zero output signal of the timer to a positive signal whereby AND Gate 96 is normally conditioned to pass a signal in response to a G1 signal to flip-flop 92 and initiate an adaptive mode of brake control. Should a G1 signal not be received at the regular input 119 of timer 110 within the set period of the timer, which may be one second, following the last G1 signal, the output of the timer becomes positive with this being converted to a zero signal at the upper input of AND Gate 96 so that the latter becomes non-conducting and as soon as this occurs all later G1 signals are blocked not only from flip-flop 92 but also from the input 119 of the timer so that it continues to produce a positive signal throughout the particular braking session involved.

In addition to blocking the transmission of the G1 signal as above described, a positive signal at the output of the timer is transferred to one input of an OR Gate 128 and also to a differentiator 130, the latter producing a pulsed output in response to a positive input which is fed to OR Gate 106 and from this to the reset inputs of the flip-flops 92,90 to extinguish the signal from the output of flip-flop 92 to control box 93 and effect closing of the exhaust valve. The reset of flip-flop 90 ensures extinguishment of a disable signal at the input 109 of the cycle rate timer and renders the upper limit of AND Gate 112 zero.

The output of OR Gate 128 is fed to the reset input of a flip-flop 132 whose output is connected to one input of an AND Gate 134 having an output connected to the supply valve power amplifier 136. The other input of the AND Gate 134 is connected through an inverter 137 to the output of a G3 comparator 138 which, as explained in the aforementioned co-pending application, responds only to an extraordinarily high rate of wheel acceleration before it produces an output signal whose purpose is to effect opening of the supply valve to permit rapid build up of brake chamber pressure. However, the output of the G3 comparator 138 is normally zero and this is converted to a positive signal by inverter 137 and fed to the upper input Of AND Gate 134 so that the latter becomes conducting to effect closing of the supply valve whenever the flip-flop 132 is in set condition.

As can be seen, the set input of the flip-flop 132 is connected to the output of the flip-flop 92 so that when the latter is set to transmit a signal to the control box 93, and effect opening of the exhaust valve, at the same time a signal is transmitted to the set input of flip-flop 132 to effect closing of the supply valve. When the signal in the input line to the control box is extinguished by the normal G2 signal as above described, this has no effect on the set condition of flip-flop 132 which remains set with the supply valve closed until such time as a signal is received at the reset input of the cycle rate timer 110 whereby the valve is opened at the same time as the exhaust valves are closed so that braking now reverts to control solely by the operator's foot on the brake pedal.

In addition to flip-flop 132 being reset by a signal from the cycle rate timer, it will be seen that it will also be reset by a second signal from OR Gate 128 derived from the brake switch when it is opened as previously explained.

In the event that the regular adaptive system has been disabled by the cycle rate timer just described, should the vehicle during the period of disablement encounter severe skidding conditions so that a combined $G_d$/-wheel speed signal is produced, the flip-flops 90,92 are set by this signal independently of the cycle rate timer, the preceding reset signal occasioned by operation of the cycle rate timer having been merely pulsed by the differentiator 130 so that a signal no longer exists at the reset input of the flip-flops. Upon this independent setting of flip-flops 92,90 a signal is transmitted from flip-flop 92 to the control box 93 to commence the override mode and a signal is also sent by flip-flop 90 to the disable input 109 of the cycle rate timer 110 to extinguish the positive signal at its output so that the timer can have no effect while the system is operating in the adaptable override mode. (It will also be seen that when the brake switch is again opened, a positive signal is transmitted by way of inverter 98, OR Gates 99,108 to the disable input 109 of the cycle rate timer to insure that it is rendered inoperative whenever the brakes are not applied.)

In addition to temporary disablement by the cycle rate timer of the adaptive mode of operation (but not of the adaptable override mode as above explained) the disablement of all modes of automatic brake control is provided by a second timer 140 hereinafter referred to as the exhaust timer. The output of the exhaust timer 140 is normally zero and remains at zero as long as a signal received at its input is extinguished within a predetermined relatively long period of time, say four seconds. As can be seen, the input of the timer is connected to the output of the flip-flop 92 so that whenever the latter transmits a signal to the output control box to open the exhaust valve, this signal is also received at the input of the exhaust timer to trigger a timing cycle. Should for some reason, for example, a catastrophic failure in the system, this signal be not extinguished within the period of the exhaust timer, as by a G2 or G max. signal, so that the exhaust valve remains open too long, the output of the timer becomes positive and the signal is transmitted to OR Gate 99 and from this to the reset input of flip-flops 90,92 and 132, and to the disable input 109 of cycle rate timer 110. In addition, a positive signal is transmitted to the input of inverter 100 leading to the output control box so that the output of the inverter is converted to zero and the output control box is no longer conditioned for operation so long as there is a positive signal delivered to the inverter 100 either from the exhaust timer or in response to opening of the brake switch.

To ensure that the system cannot be re-enabled by any means controllable by the operator, the invention provides a disable memory device 142 which is energized in response to a positive output signal from the exhaust timer and this may permanently disable the system until it can be disassembled at a later time to discover the precise cause of the derangement. On the other hand, the memory may disable automatic control only for the duration of the particular brake application in which the derangement occurs.

It is believed that the operation of the system should be apparent from the above description. Briefly, when the system is operating in the regular adaptive mode, a signal received from the differentiator 86 at the G1 level effects opening of the exhaust valve to relieve brake pressure while wheel acceleration closes the exhaust valves at the G2 level. This is done by the operation of the output signals of the G1 and G2 comparators on the set and reset inputs of the flip-flop 92. If desired, the exhaust area may be varied depending on residual wheel acceleration following closing of the exhaust valves, that is to say, if there is excessive reduction in pressure resulting in too great a wheel acceleration, a G5 comparator 146 transmits a memory signal to an exhaust area logic box 148 to effect opening of the next smaller exhaust area at the beginning of the next cycle but if the wheel accelerates to an optimum level G4, a G4 comparator 150 responds to instruct the retention of the same exhaust area as in the last cycle; if the G4 level is not reached (insufficient exhaust) the system responds to open the next larger exhaust area at the next cycle. These features are all described in detail in the aforementioned co-pending application.

Now in the event that a vehicle runs into an unusually slippery road portion before or during an adaptive mode of brake control so that a combined $G_o$/wheel speed signal is produced, because $G_o$ is at a markedly less rate of deceleration than G1, the system operates earlier to open the exhaust valve than in the regular adaptive mode and because relatively high residual pressure may have been trapped in the brake chamber when the last regular G2 signal was received, now in the adaptable override mode the regular G2 signal is blocked for a time delay period which may be fixed but is preferably variable and adaptable to existing conditions as determined by the length of time it takes a wheel to reach its maximum rate of acceleration following reduction in pressure by opening of exhaust valve which, as indicated in FIG. 2, is substantially after the time at which the G2 level is reached in order that sufficient pressure will be relieved to ensure wheel recovery to such an extent in view of existing and probably continuously variable conditions so that that the wheel will not go immediately into wheel lock up upon the restoration of pressure following closing of the exhaust valve. The peak detector 116 senses maximum wheel acceleration rate from the differentiator 86 and transmits a signal permitting the already generated G2 signal to pass through to the reset inputs of flip-flops 92,90 to effect closing of the exhaust valves and so long as the $G_o$/wheel speed signal is reached in each subsequent cycle the system repeats the adaptable override mode until the vehicle stops or moves on to a better road surface whereby a wheel speed signal equal to the reference level of the wheel speed comparator 80 is not reached so that the system reverts to the regular adaptive mode of operation all as above explained.

The invention also provides a cycle rate timer for disabling the primary system during a single braking session whenever the consecutive G1 signals are not produced within the cycle period of the timer, with means being provided for disabling the timer whenever the system goes into an adaptable override mode. Second timer means are also provided for permanently or temporarily disabling the entire system whenever there is a failure as the result of a catastrophic derangement, all as above described.

It will be apparent that the system of the invention is susceptible of a variety of changes and modifications without however departing from the scope and spirit of the appended claims.

What is claimed is:

1. In a fluid pressure brake system, anti-skid means for controlling brake application in the event of wheel skid comprising means for generating a first signal in response to a linear wheel speed of a predetermined value, means for generating a second signal in response to deceleration of said wheel to a predetermined value, means for generating a third signal in response to the simultaneous generation of said first and second signals, and means effecting a reduction of fluid pressure in the brake system in response ro said third signal, means for producing a fourth signal at the termination of a period of time, means responsive to said fourth signal for effecting restoration of fluid pressure in said system, and means responsive to said third signal for initiating said period of time, means for generating a fifth signal in response to deceleration of said wheel to a predetermined value greater than said first mentioned predetermined deceleration value, means for operating said pressure reduction means in response to said fifth signal, means for generating a sixth signal in response to acceleration of said wheel to a predetermined value during the reduction of pressure in said system, means for effecting restoration of fluid pressure in response to said sixth signal, and means responsive to the presence of said third signal for preventing said sixth signal from effecting restoration of fluid pressure in said system at said predetermined value of wheel acceleration.

2. In the system of claim 1 including means responsive to maximum wheel acceleration following reduction of pressure in said system for enabling said sixth signal to effect restoration of fluid pressure in said system.

3. In the system of claim 2 timer means operable to produce a seventh signal, means responsive to the generation of said fifth signal for preventing said timer means from producing a seventh signal for a predetermined period of time following the generation of said fifth signal, and means responsive to said seventh signal produced by said timer means in the absence of the generation of a fifth signal within said predetermined period of time for preventing said fifth and sixth signals from effecting operation of said pressure reduction and restoration means, respectively.

4. In the system of claim 3 including means responsive to the generation of said third signal for disabling said timer means, and means responsive to maximum wheel acceleration for reenabling said timer means following reduction of braking pressure in response to said third signal.

5. In the system of claim 3 including a disable memory responsive to said seventh signal for permanently preventing said third and fifth signals and said sixth signal from effecting operation of said pressure reduction and restoration means, respectively.

* * * * *